US012765510B2

(12) United States Patent
Peters

(10) Patent No.: US 12,765,510 B2
(45) Date of Patent: Oct. 20, 2026

(54) PORTABLE CORRAL POWER FOLD

(71) Applicant: Kyle Peters, Linn, KS (US)

(72) Inventor: Kyle Peters, Linn, KS (US)

(*) Notice: Subject to any disclaimer, the term of this patent is extended or adjusted under 35 U.S.C. 154(b) by 187 days.

(21) Appl. No.: 18/431,171

(22) Filed: Feb. 2, 2024

(65) Prior Publication Data

US 2024/0260539 A1 Aug. 8, 2024

Related U.S. Application Data

(60) Provisional application No. 63/548,755, filed on Feb. 1, 2024, provisional application No. 63/442,975, filed on Feb. 2, 2023.

(51) Int. Cl.
*A01K 3/00* (2006.01)

(52) U.S. Cl.
CPC .................................... *A01K 3/001* (2021.08)

(58) Field of Classification Search
CPC .. A01K 1/0272; A01K 1/0005; A01K 1/0035; A01K 3/001; E04H 17/18
See application file for complete search history.

(56) References Cited

U.S. PATENT DOCUMENTS 3,921,585 A * 11/1975 Hall .......................... B60P 3/04 119/512
4,341,181 A * 7/1982 Fair ........................ A01K 3/001 119/512
4,619,223 A * 10/1986 Koehn ................... A01K 3/001 119/512
4,924,813 A * 5/1990 Bixler .................... A01K 3/001 119/512
5,115,763 A * 5/1992 Wilson ................... A01K 3/001 119/512
RE33,959 E * 6/1992 Mollhagen ............. A01K 29/00 119/512
5,237,960 A * 8/1993 Wilson ................... A01K 3/001 119/848
5,381,757 A * 1/1995 Putney ................... A01K 3/001 119/512
6,067,940 A * 5/2000 Holder ................... A01K 3/001 119/512
8,276,929 B1 * 10/2012 Baker .................. A01K 1/0035 119/512
10,085,438 B1 * 10/2018 Dismang ................ A01K 3/001
11,793,158 B1 * 10/2023 McDonald ............. A01K 3/001
2002/0015635 A1* 2/2002 Sinn ....................... B65G 67/08 414/346
2009/0000564 A1* 1/2009 Meyer, Jr. .............. A01K 3/001 119/512
2010/0119398 A1* 5/2010 Orlandi ................. F04C 11/001 418/61.3

(Continued)

*Primary Examiner* — Daniel J Wiley
(74) *Attorney, Agent, or Firm* — Kutak Rock LLP

(57) ABSTRACT

The instant invention provides systems and methods for powered folding and unfolding of panels for a portable corral. An exemplary embodiment of the present invention includes interconnected fence panels, a motor, a drive wheel, hydraulic and/or electrical lines, controls, and a power unit. Generally, the motors and drive wheels are connected to the folded panels and are utilized to unfold said panels to deploy the corral without the need for the operator to physically move the panels. Also included is a lift system for lifting the corral up for transport and lowering the corral to the ground for deployment.

17 Claims, 10 Drawing Sheets

(56) References Cited

U.S. PATENT DOCUMENTS

| | | | | |
|---|---|---|---|---|
| 2011/0120384 | A1* | 5/2011 | Wilson | A01K 3/001 119/521 |
| 2011/0293394 | A1* | 12/2011 | Koehn | A01K 1/0128 414/813 |
| 2015/0075442 | A1* | 3/2015 | Wilson | A01K 3/001 119/512 |
| 2015/0250136 | A1* | 9/2015 | Wilson | A01K 3/001 119/452 |
| 2015/0334987 | A1* | 11/2015 | Schwartz | A01K 3/001 119/514 |
| 2017/0267153 | A1* | 9/2017 | Novero | B60P 3/04 |
| 2018/0055001 | A1* | 3/2018 | Niemela | A01K 1/0005 |
| 2020/0040600 | A1* | 2/2020 | Mollhagen | E04H 17/18 |
| 2020/0062163 | A1* | 2/2020 | Langrell | B60P 3/04 |
| 2020/0097023 | A1* | 3/2020 | Grundey | G05D 1/0293 |
| 2021/0031665 | A1* | 2/2021 | Niemela | A01K 5/0107 |
| 2021/0092934 | A1* | 4/2021 | Greive | A01K 1/105 |
| 2021/0219516 | A1* | 7/2021 | Langrell | A01K 1/0029 |
| 2021/0360897 | A1* | 11/2021 | Wilson | A01K 1/0613 |
| 2023/0105217 | A1* | 4/2023 | Coady | B60K 7/0007 180/6.2 |
| 2023/0337628 | A1* | 10/2023 | Langrell | B60P 3/04 |
| 2024/0224933 | A1* | 7/2024 | Hornung | A01K 3/001 |
| 2025/0134060 | A1* | 5/2025 | Mollhagen | E04H 17/18 |
| 2025/0287911 | A1* | 9/2025 | McDonald | B62D 63/08 |

* cited by examiner

200

210

PORTABLE CORRAL POWER FOLD

CROSS-REFERENCE TO RELATED APPLICATIONS

This application claims priority to U.S. Provisional Patent Application No. 63/442,975, filed Feb. 2, 2023, and U.S. Provisional Patent Application No. 63/548,755, filed Feb. 1, 2024, the entire disclosures of which are incorporated herein by reference.

FIELD OF THE INVENTION

The present inventive concept relates to portable cattle corral systems used to catch and gather cattle in fields and pastures. More specifically, the inventive concept relates to systems and methods that assist the operator in the folding and unfolding of the panels used to create the enclosure of the portable corral.

BACKGROUND

Cattle ranchers use corrals, also known as enclosures or pens, to gather and keep livestock in a fixed location to count, sort, brand, load, vaccinate, or otherwise process the cattle in some way. Historically, corrals would often be built in remote parts of a cattle ranch so that they could be used to process cattle without the need to bring the cattle a long distance back to the ranch headquarters. However, especially for large ranches, the cost and resources needed to build sufficient corrals throughout the extent of the pastures has the potential to become extremely expensive. Moreover, even with numerous fixed corrals, ranchers may still need to herd the cattle a significant distance to the nearest corral.

More recently, ranchers and/or ranch equipment suppliers have developed portable corrals, wherein interconnected fence panels are capable of being folded and unfolded for assembly, disassembly, and transport. Use of the portable corral allows ranchers to bring the corral to the herd. With portable corrals, even ranchers with the largest pastures are able to utilize a corral nearby a given herd. Ranchers also are able to cut down on costs and resources by using a more limited number of portable corrals in lieu of building a system of fixed corrals throughout their property. Groups of ranchers are also able to share sets of portable corrals amongst each other to further cut costs.

An additional advantage of portable corrals is the capability to bring the portable corral to cattle which are not fully mobile. For example, a portable corral is capable of being used for vaccinating younger calves that otherwise cannot be herded to a stationary corral.

Despite these advantages, modern portable corrals have many drawbacks that make them difficult and potentially dangerous to use. First, the panels needed for the portable corrals must be large and sturdy, and therefore generally are too heavy to be lifted by hand. Furthermore, to create a secure enclosure, the panels must be attached in an interconnected series. Therefore, the panels must be folded out to form the corral. It is thus common practice to attach wheels to the bottom of the panels to be able to roll the panels along the ground while unfolding the portable corral.

Nevertheless, rolling out the heavy, interconnected panels is a strenuous task, particularly in the rough and irregular terrain of most pastures. Rolling out panels also has the potential to be dangerous as the heavy panels can be difficult to stop from rolling in either direction creating a risk of the operator being hit by a moving panel or even pinched between two panels. Due to these risks and drawbacks, there has long been a desire to simplify the unfolding process.

One method used by portable corral manufacturers is a cable and winch system attached from the central frame of the portable coral to the outside of the folding panels. The cable and winch system allows the operators to winch the panels off the ground to reduce the weight being pushed or pulled by the operator during the unfolding process. However, the cable and winch system adds the risk of cable failure, which has the potential injure the operator. Additionally, the system is limited by the range of the cable.

Industry reports show that cattle ranchers, on average, are getting older as a result of less new ranchers coming into the field. The issues associated with portable corrals are magnified when applied to these older ranchers who will have even more difficulty and risk unfolding heavy panels.

Therefore, it is desirable to provide a system and/or method to assist an operator in setting up, breaking down, and moving portable corrals and similar systems.

SUMMARY

The instant invention provides systems and methods for powered folding and unfolding of panels for a portable corral. An exemplary embodiment of the present invention includes interconnected fence panels, a motor, a drive wheel, hydraulic and/or electrical lines, controls, and a power unit. Generally, the motors and drive wheels are connected to the folded panels and are utilized to unfold said panels to deploy the corral without the need for the operator to physically move the panels. Also included is a lift system for lifting the corral up for transport and lowering the corral to the ground for deployment.

The motors of the present invention include hydraulic, electric, and other types of power sources for either powering the motors directly or recharging batteries (if being used). Generally, the portable corral is first lowered from the transport at the location to be deployed. The motors are connected to the bottom of each panel that needs to be unfolded. Once the portable corral is in place, the operator activates the motors to unfold and deploy the corral. The reverse may be done when time to move the corral. The motors fold the corral back into a storable configuration and the corral is lifted back onto the transport for relocation.

Thus, ranchers and other operators of any age and health are able to easily transport and deploy the corral without the need for hard physical labor.

It will be appreciated that other embodiments of the inventive concept herein are capable of being adapted to portable livestock handling equipment that utilize foldable panels, such as a portable cattle working chute and alleyway systems.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the inventive concept, illustrative of the best mode in which the applicant has contemplated applying the principles, is set forth in the instant description and is shown in the drawings.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

An exemplary embodiment of the present invention includes interconnected fence panels, a motor, a drive wheel, hydraulic and/or electrical lines, controls, and a power unit. Generally, the motors and drive wheels are connected to the folded panels and are utilized to unfold said panels to deploy the corral without the need for the operator to physically move the panels. Also included is a lift system for lifting the corral up for transport and lowering the corral to the ground for deployment.

Figure 1:
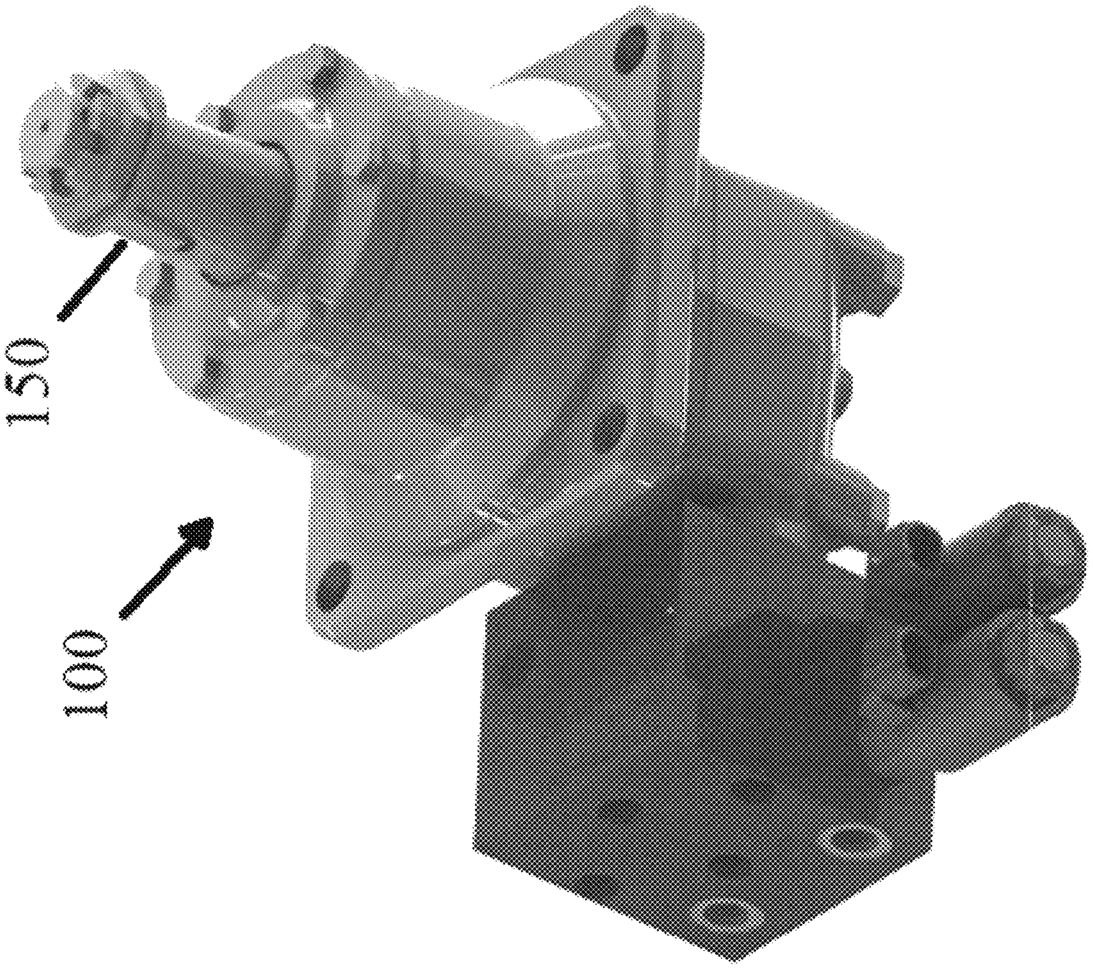
FIG. 1 shows an embodiment of a tapered shaft of the present invention.

In some embodiments, one or more hydraulic drive motors 100 are used to move the panels and unfold the corral into a deployed state. In some embodiments, the hydraulic drive motor 100 has a displacement of 36 CM3/R (2.2 IN3/R) and the gerotor is free running. In some embodiments the motor 100 has a tapered shaft as seen in FIG. 1. It will be appreciated that various other embodiments of the drive shaft 150 are used in different embodiments of the present invention.

In some embodiments, the motors include a DC parallel shaft gearmotor. In some such embodiments, the DC parallel shaft gearmotors have 24V rated voltage, 38 RPM, 660 lb-in torque, and outputs 7⁄16 horsepower. In other embodiments, the power supply is 12V. In some embodiments, one or more of the motors are powered by a battery or a plurality of batteries. In some such embodiments, the batteries are maintained and recharged by a solar panel and charger. One such embodiment may include a 24 v battery connected to a 25 w solar panel.

It will be appreciated that embodiments of the invention include various different power sources for either powering the motors directly or recharging batteries. Power sources of various embodiments include electric, hydraulic, or other types of power. Furthermore, in some embodiments low batteries are swapped for new batteries.

Figure 3:
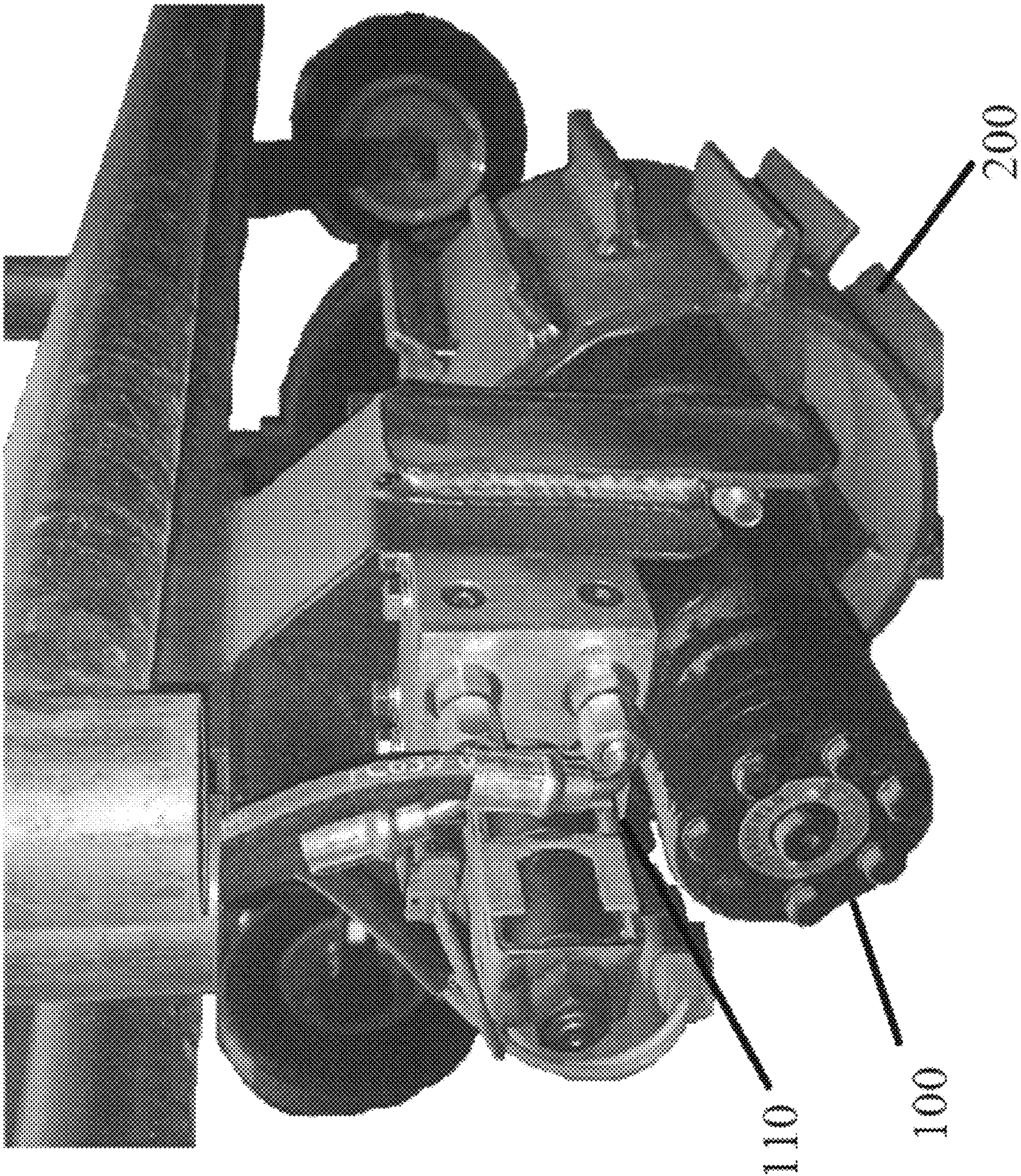
FIG. 3 shows a hydraulic drive motor attached directly underneath a fence panel according to some embodiments of the present invention.
Figure 4:
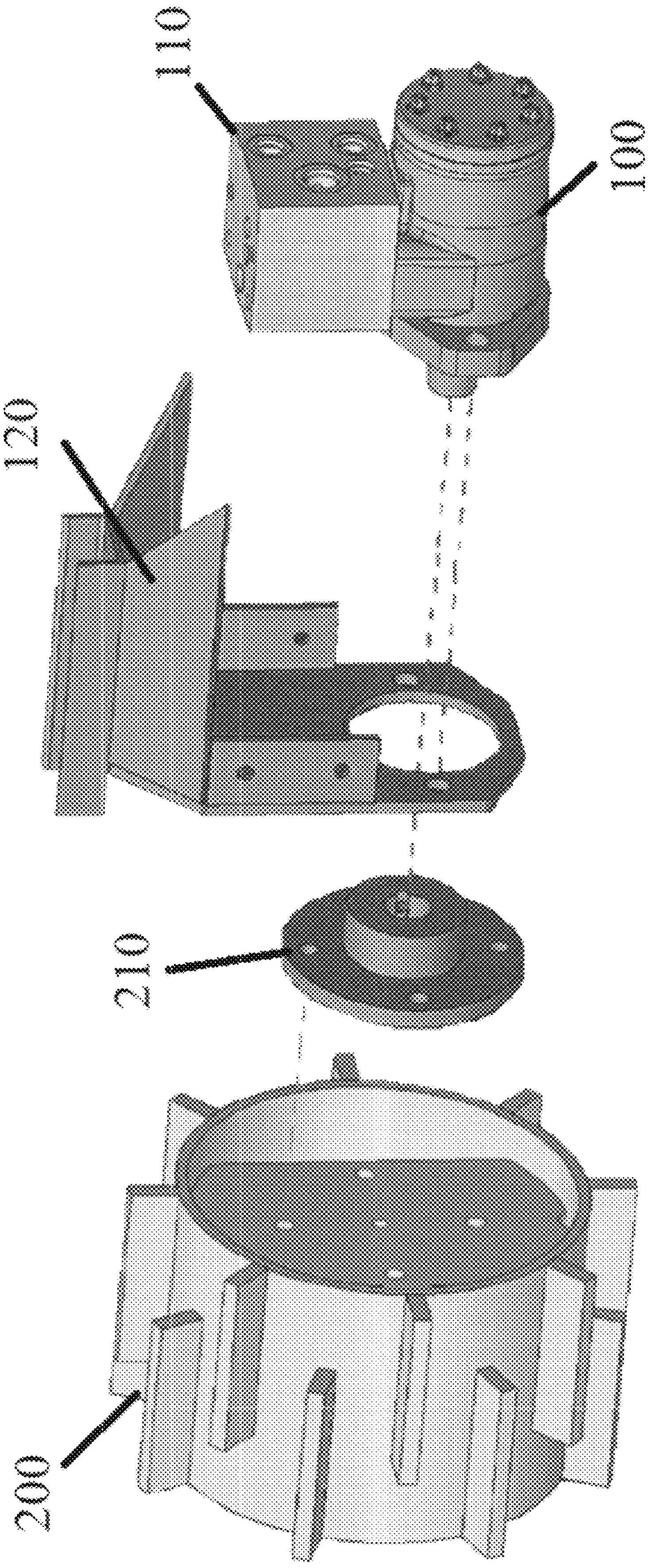
FIG. 4 shows the wheel hub assembly according to some embodiments of the present invention.
Figure 5:
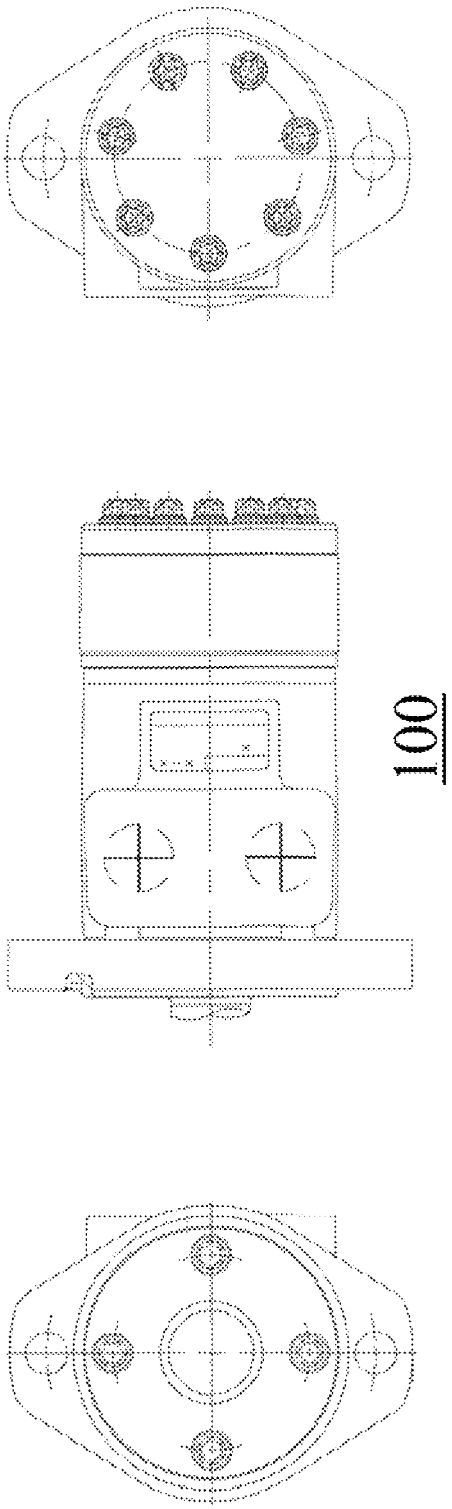
FIG. 5 is a schematic of a motor according to some embodiments of the present invention.
Figure 6:
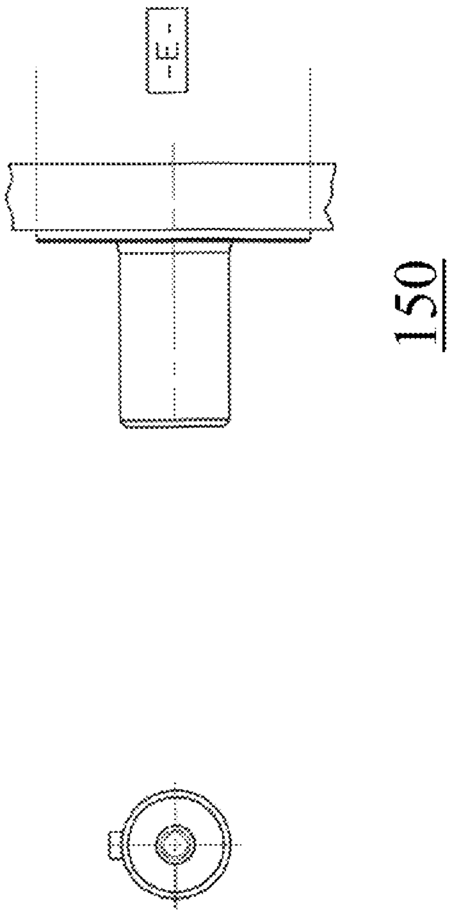
FIG. 6 is a schematic of a straight drive shaft according to some embodiments of the present invention.
Figure 7:
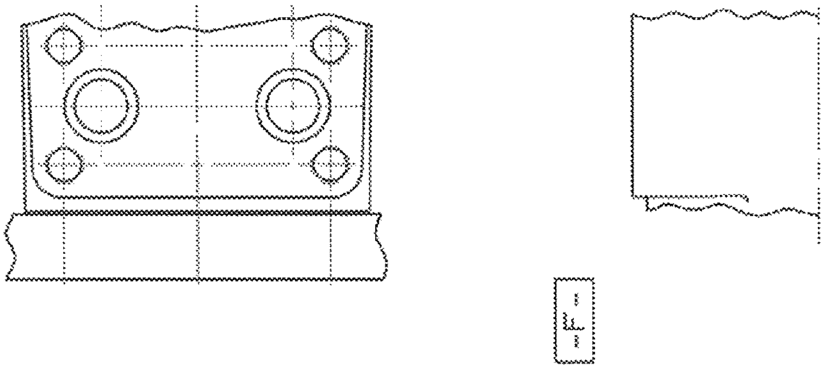
FIG. 7 is a schematic showing the port size and mounting holes for solenoid mounting onto the drive motor, according to some embodiments of the present invention.
Figure 8:
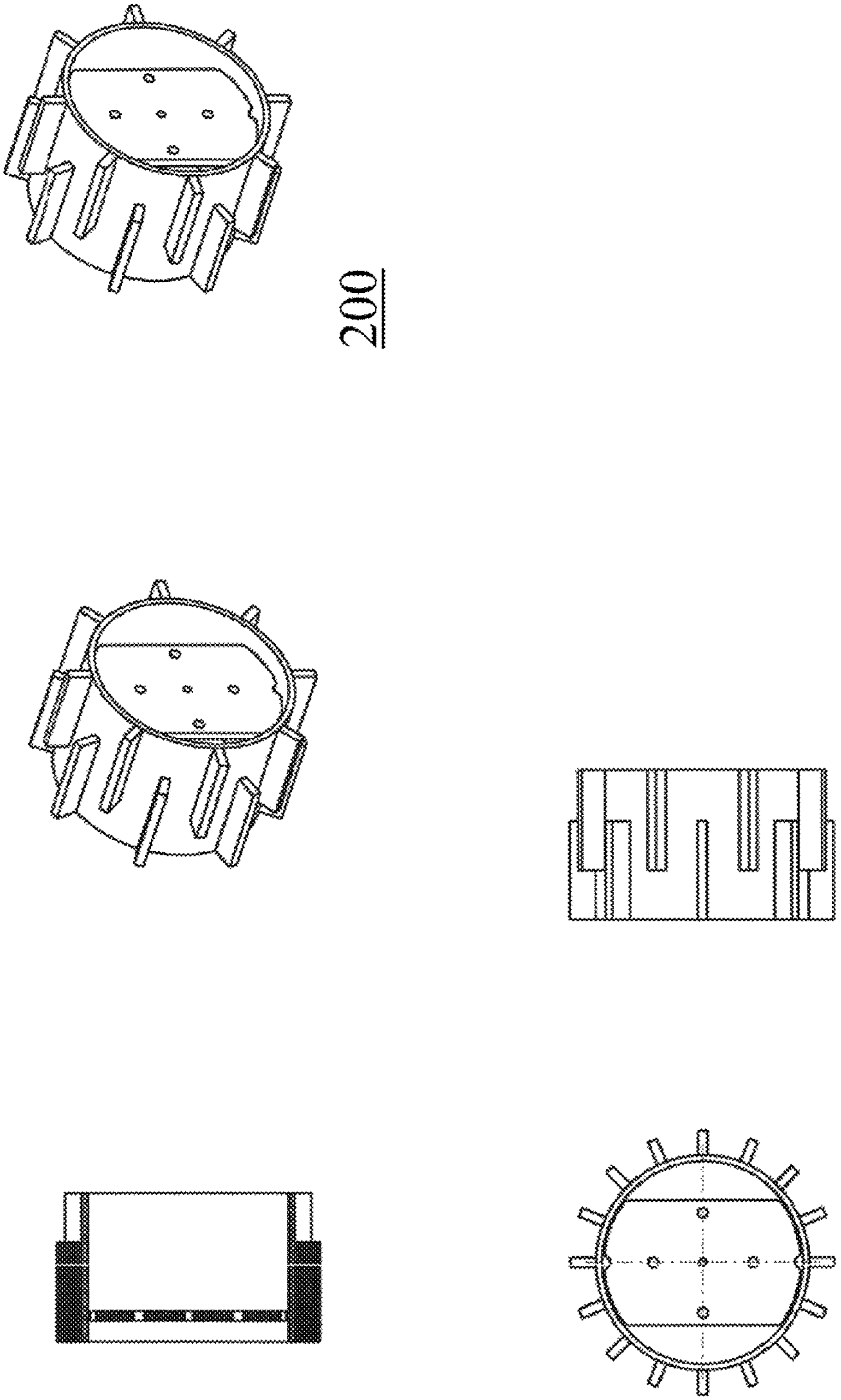
FIG. 8 is a schematic of a wheel according to some embodiments of the present invention.
Figure 9:
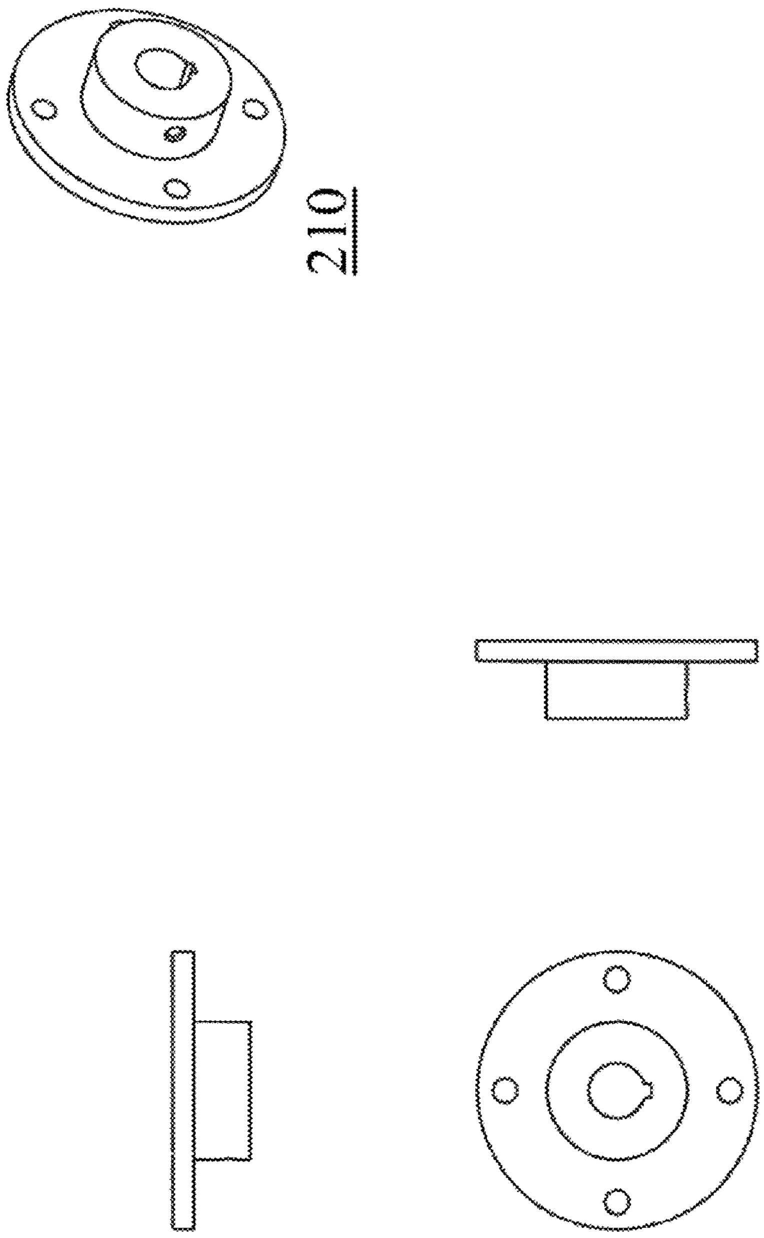
FIG. 9 is a schematic of a wheel hub according to some embodiments of the present invention
Figure 10:
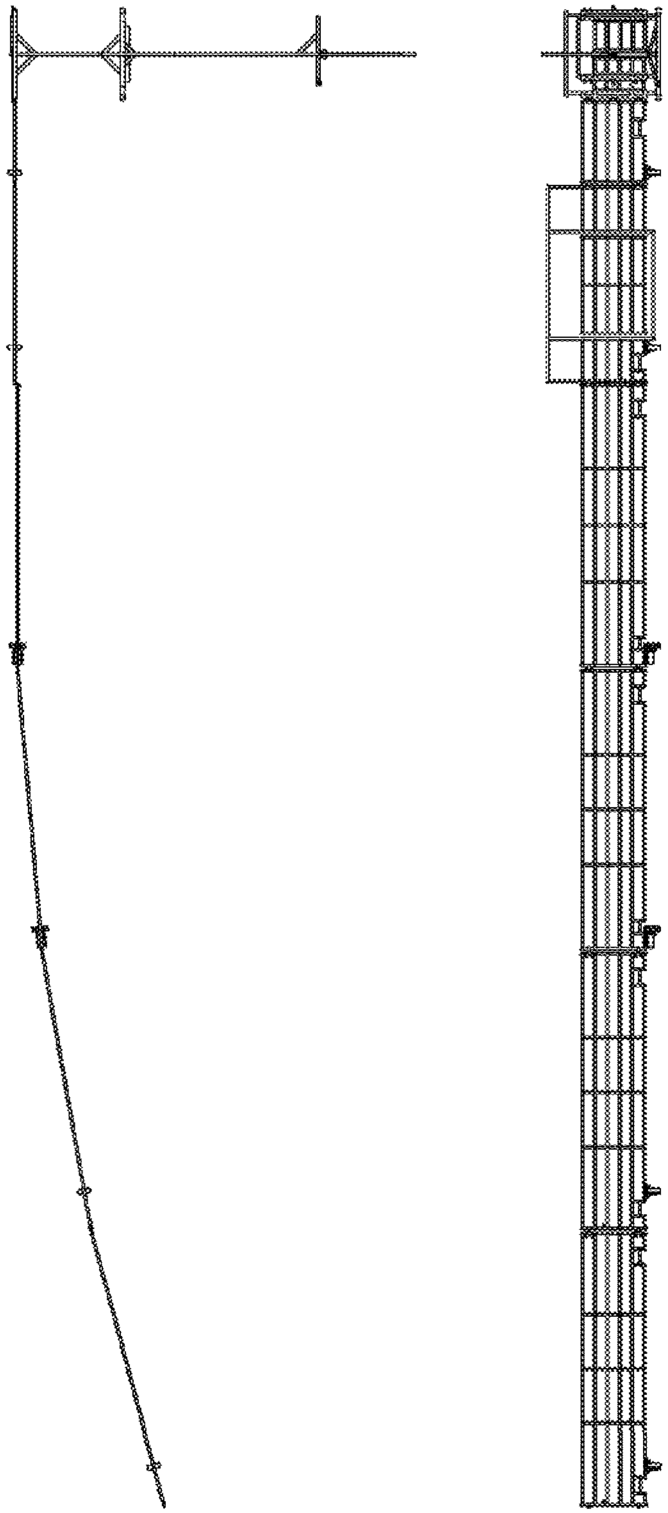
FIG. 10 shows an embodiment of the present invention using an exemplary panel.

In some embodiments, the motor is mounted directly underneath the panel as seen in FIG. 3. The placement keeps the motor and wheel from sticking out from the end of the panel and possibly interfering with the operator or necessitating lengthening of the entire corral frame to accommodate the protrusion. As seen in FIG. 4, a custom made "bracket" (or "shield") 120 is utilized to attach the motor 100 and drive wheel 200 (shown on the left) to the panel. As seen in FIG. 4, the custom bracket 120 also operates as a shield for the motor/solenoid (on the right). A custom-made wheel hub 210 facilitates wheel 200 to hub 210 to bracket 120 to motor 100 mounting and makes assembly or replacing parts easy to bolt on or off, this total assembly is shown in FIG. 4.

Figure 2:
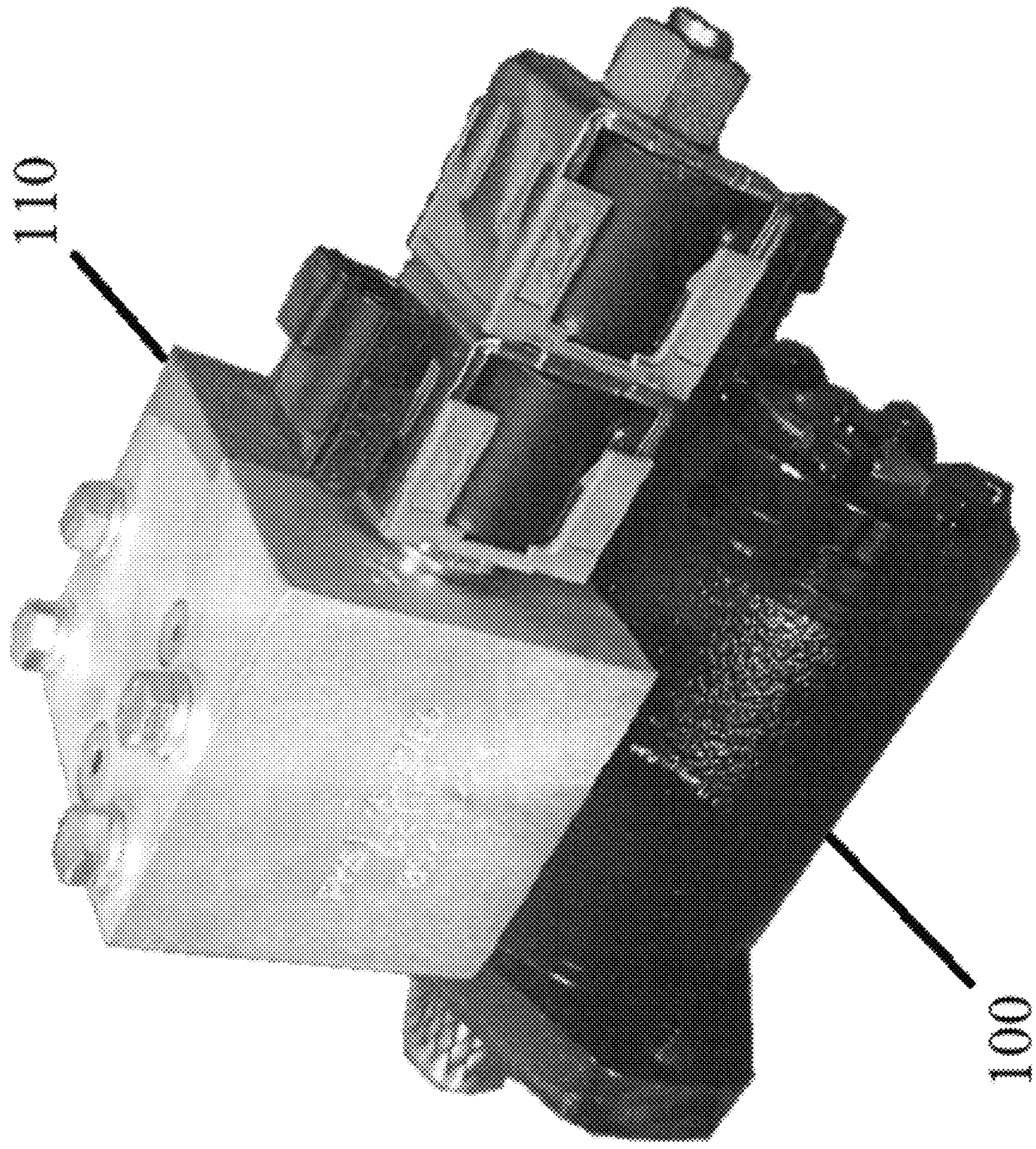
FIG. 2 shows a solenoid mounted on a hydraulic drive motor according to some embodiments of the present invention.

In some embodiments, a solenoid 110 is mounted onto the motor 100, as seen in FIGS. 2 and 4. In some embodiments, the solenoid 110 is topside mounted. Topside mounting of the solenoid confers the advantage of protection from debris as the panels move. In such embodiments, the motor acts as a shield. In some embodiments, an additional shield panel is added, as seen in FIG. 4. In some embodiments, port size and mounting holes are used.

In some embodiments, the wheels 200 are made from steel. In some embodiments the wheels have flat metal treads welded on edge for traction. In some embodiments the wheel treads are channel iron. In some embodiments the wheel treads are solid round bars. In some embodiments, as shown in FIG. 4, the wheel treads are staggered to provide a smooth roll while giving wheels adequate grip to the ground and area for loose dirt/mud to exit the wheel treads while moving. Debris caught in the treads may cause the wheels to lose traction. In some embodiments, the wheels are molded out of some poly-type materials, wherein the wheel treads are in the mold design. In some embodiments there is a base wheel that is adapted to receive different tread sizes and shapes. In such embodiments, the operator is able to adjust to different ground tyles without changing the entire wheel, but rather by simply changing out the treads. In some such embodiments, the custom treads slide over or bolt on to the blank, base wheel.

In some embodiments of the invention, the wheels 200 are swappable or otherwise modifiable. In some such embodiments, the swapping and/or modifications are accomplished in the field by the operator. This modularity allows for the adaption to various types of terrain. For example, wheels used for grassy terrain are capable of being swapped out for those needed for sandy or muddy ground. In alternative embodiments the wheels are capable of being modified to fit the terrain without having to replace or swap the wheel. In some embodiments, these actions are accomplished by the operator of the portable corral system. In some embodiments the wheels are made of steel. In other embodiments, the wheels are made of aluminum. In other embodiments, the wheels are made of plastic or polymer material. In some embodiments of the inventive concept, the wheels are connected to the motor by a spline method. In other embodiments, the wheels are connected via a hub method or a keyway shaft method.

In some embodiments of the inventive concept, there is a series of non-motorized and motorized wheels. The wheels are capable of being arranged in such a manner to increase effectiveness and efficiency.

In some embodiments ¼" hydraulic hose lines are used. In some embodiments, ⅜" hydraulic hose lines are used. It will be appreciated that a combination of both sizes, and additional sizes are used in various embodiments, and appropriate fitting sizes for each hose size are used. In some embodiments, a 3-way running T connection fitting is used that allows for the hydraulic fluid to flow from panel to panel and route down to motors where needed. In some such embodiments, a parallel line swivel is utilized.

In some embodiments the electrical connection will utilize all weather connections commonly known in the industry as "Deutsch Connectors."

In some embodiments, the hydraulic and electrical lines are run on top of panels. In some embodiments of the invention, the wiring is passed through the interior of the panels and is capable of being partially or fully hidden and/or protected from undesirable breakage. The lines routed inside of the panel tubes are protected from elements and cattle chewing on them. In such embodiments, there are connections and fittings at each end of each panel to make connecting the panels easy. This allows for easier assembly and future replacement of panels.

In some embodiments the wiring is ran continuously through an individual panel or a series of panels, and connected by a sealed connector. In some embodiments this sealed connector is a snap connector. The snap connection of the wiring allows a panel in a series of panels to be replaced, removed, or added, without the need to cut and splice the wiring. Instead, portions of the wiring may be easily unsnapped or snapped in place between panels. In some embodiments the wiring has snap together automotive-type connections. In some embodiments of the inventive concept, the wiring is ran through a conduit connected to the exterior of the panels.

In some embodiments, a wireless remote-control system is used to control the folding and unfolding of the panels. In some embodiments, a wireless remote system with no override is used. In such embodiments, the system has a wireless remote and no other back up option to move corral panels beside manually pushing them. But such a system is cheaper to produce. In some embodiments, a wireless remote system with an override is used. In such embodiments, the system type utilizes a fixed remote as a backup such as stationary buttons so if the wireless remote were out of operation, then operator could use these buttons on main control panel to activate drive motors 100 to unfold/fold corral panels. In other embodiments, the backup is a joystick lever on a bank of valves.

In some embodiments, a central control box is used to house the wiring for the control system. In some such embodiment, wiring is done manually to connect each wire to its proper location. In some embodiments, A CAN bus wiring type system is utilized for wiring. In some such embodiments, wires do not need to be run individually but instead connector at the end of the wire snaps into the control box.

In some embodiments, a remote with a cord is used as a backup option if the wireless option were to fail. In some such embodiments, the wired remote is plugged into a port at each motor and activates the drive to make it move. In some such embodiments, a single wired remote is used that is able to be unplugged and moved to one motor at a time. In some such embodiments, if the operator lets go of the wired remote intentionally or not, the motor automatically returns to neutral and stops moving the panels.

In some embodiments, a hydraulic power unit with a custom valve box is used. In some such embodiments, there unit allows for operation of 6 functions. In such embodiments, 8 hydraulic drive motors on panels are able to be activated simultaneously. Independently from the hydraulic motors—when chosen with a selector valve—both of the hydraulic lift cylinders for raising and lowering the entire corral system to or from transport mode are able to simultaneously be activated. In some embodiments, a 4 function valve block is used to activate the lift cylinders and panel drive motors.

In some embodiments, the power supply is 12 volts. In other embodiments, the power supply is 24 volts. In some embodiments, power is supplied by a portable unit running on gasoline.

In some embodiments, the portable corral system is entirely electrical. In some such embodiments, the system uses a CAN bus wiring system with only 2 wires routed to each motor.

In some embodiments of the inventive concept, there is a custom controller to be used by the operator to control the power, speed, and/or other characteristics of the system. In some embodiments of the inventive concept the custom controller is wireless and remote. In alternative embodiments, the custom controller is wired.

In some embodiments of the inventive concept, one or more of the motors are attached to the corral panels via a mounting system. In some embodiments the mounting system is adjustable.

It will be appreciated that other embodiments of the inventive concept herein are capable of being adapted to portable livestock handling equipment that utilize foldable panels, such as a portable cattle working chute and alleyway systems.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

What is claimed is:

1. A portable corral system comprising:

a plurality of interconnected fence panels;

at least one wheel motor, wherein each wheel motor is affixed to the bottom of a fence panel;

a drive wheel associated with each wheel motor, wherein each drive wheel is configured to contract the ground beneath the respective fence panel when in a deployed configuration, wherein each wheel includes a plurality of treads; and a hydraulic lift connected to said portable corral system configured to raise and lower said portable corral system between a transport configuration and the deployed configuration.

2. The portable corral system of claim 1, further including a power unit, wherein said power unit is connected to each wheel motor by lines routed through the interiors of said fence panels.

3. The portable corral system of claim 2, wherein the power unit is a battery.

4. The portable corral system of claim 2, wherein the power unit is gasoline powered.

5. The portable corral system of claim 1, wherein said plurality of treads of each drive wheel are staggered.

6. The portable corral system of claim 1, wherein each motor includes a straight drive shaft.

7. The portable corral system of claim 1, wherein each motor includes a tapered drive shaft.

8. The portable corral system of claim 1, further including a control system that includes:
- a central control box;
- a main control panel connected to said central control box; and
- a wireless remote controller.

9. The portable corral system of claim 1, wherein each motor is an electric motor.

10. A portable corral system comprising:
- a plurality of interconnected fence panels;
- a hydraulic power supply;
- at least one hydraulic motor, wherein each hydraulic motor is affixed to a fence panel with a bracket;
- a drive wheel associated with each hydraulic motor, wherein each drive wheel includes a plurality of treads;
- at least one power unit connected to the corral system; and
- a control system;
- a hydraulic lift; and
- a selector valve used to transfer the power of the hydraulic power supply from said hydraulic lift to the at least one hydraulic motor.

11. The portable corral system of claim 10, further including a wheel hub connected to each drive wheel and each respective bracket.

12. The portable corral system of claim 11, wherein each bracket includes a shield protecting each respective solenoid.

13. The portable corral system of claim 10, further including a solenoid mounted to the topside of each hydraulic motor.

14. The portable corral system of claim 10, wherein said power unit is connected to each hydraulic motor by lines routed through the interiors of said fence panels.

15. The portable corral system of claim 10, wherein each hydraulic drive motor has a displacement of 36 $CM^3/R$.

16. A method for deploying a portable corral system with an associated hydraulic power supply, the method comprising:
- lowering the portable corral system from a stowed configuration to a deployment area with a hydraulic lift powered by said hydraulic power supply, wherein said portable corral system includes a plurality of interconnected fence panels that are folded together when in the stowed configuration, each fence panel including a motor affixed thereto;
- unfolding a first fence panel by activating the motor affixed to the first fence panel;
- wherein a selector valve is used to transfer the power of the hydraulic power supply from said hydraulic lift to the motor of said first fence panel.

17. The method of claim 16, further including the step of unfolding a second fence panel by activating the motor affixed to the second fence panel.

* * * * *